Dec. 16, 1924.
J. B. MOORE
INDICATING DEVICE
Filed Jan. 20, 1922
1,519,214
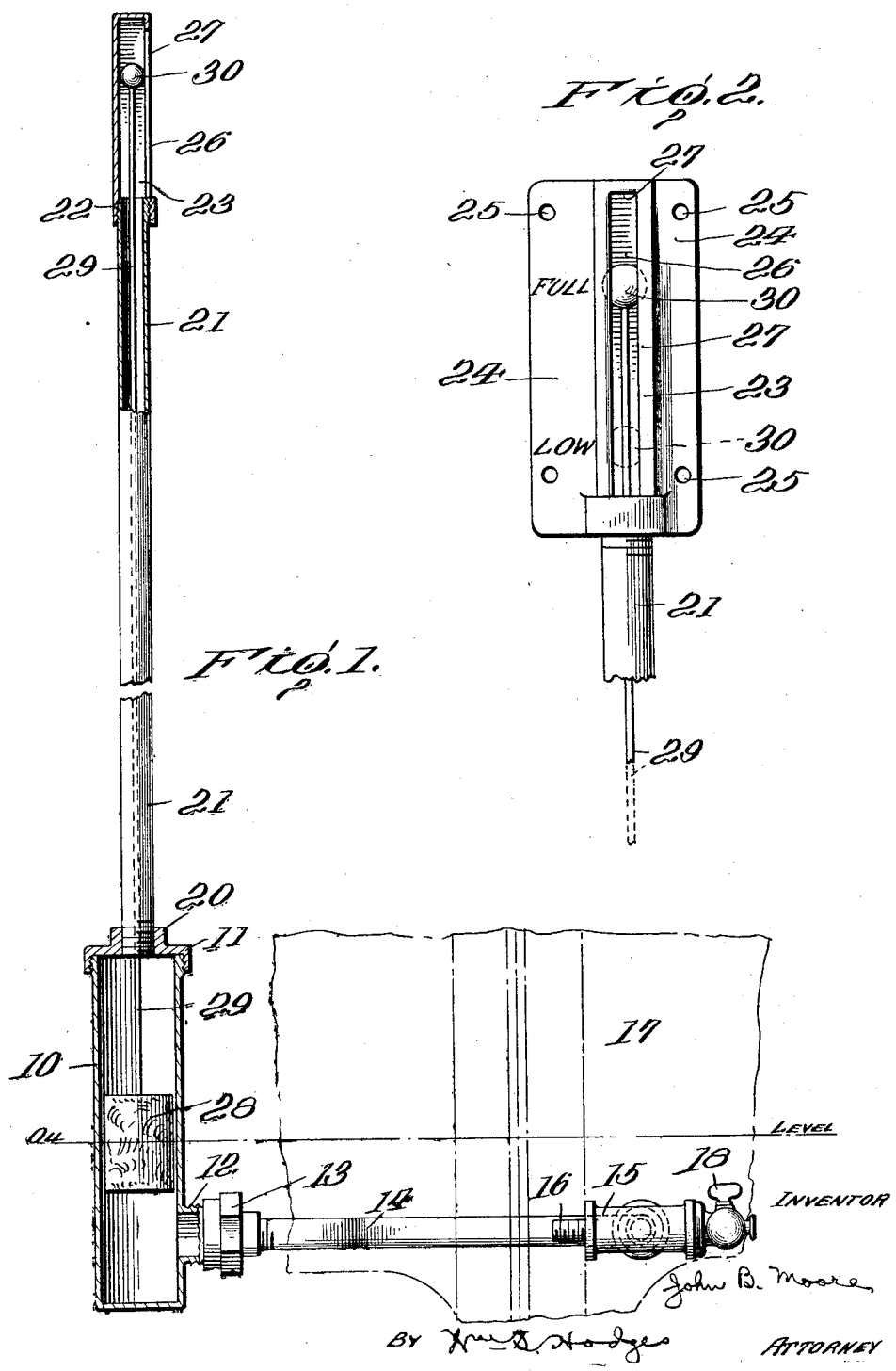

Patented Dec. 16, 1924.

1,519,214

UNITED STATES PATENT OFFICE.

JOHN B. MOORE, OF LATROBE, PENNSYLVANIA.

INDICATING DEVICE.

Application filed January 20, 1922. Serial No. 530,591.

*To all whom it may concern:*

Be it known that I, JOHN B. MOORE, a citizen of the United States, residing at Latrobe, in the county of Westmoreland and State of Pennsylvania, have invented a new and useful Indicating Device, of which the following is a specification.

This invention is a device for indicating the quantity of oil within the crank case of an engine.

In the operation of motor vehicles it is important to maintain proper lubrication of the engine, but in the absence of some means for indicating the quantity of oil within the crank case, frequent inspections are necessary in order that the driver may keep himself informed as to the actual conditions. Heretofore indicators capable of being attached to a suitable support, such as the dash board of the vehicle, have been designed to indicate the oil level within the crank case. These are open to the objection that they are constructed with glass parts which are easily broken, or become so scratched and scarred as to render them useless. Their value as indicators is thus completely destroyed or greatly impaired.

One of the objects of the invention is to overcome the foregoing objections by providing an indicator of simple construction, free of parts constructed of glass or other fragile material, and so designed that its indicating functions may not be easily destroyed or impaired. A further object is to provide an indicator of the character mentioned so constructed that its accuracy may be readily verified.

The invention will be hereinafter fully set forth and particularly pointed out in the claims.

In the accompanying drawing:—

Figure 1 is a side elevation, parts being in section, illustrating an indicator constructed in accordance with the invention.

Figure 2 is a front elevation thereof.

Referring to the drawing, 10 designates a reservoir casing, provided with a removable cover 11, and a threaded boss 12. Connected with the boss 12, by means of a coupling 13, is a bent pipe 14, one end of the pipe being provided with the said coupling, the other end being provided with a T-coupling 15. One branch of the said coupling 15 is provided with a nipple 16, whereby it may be connected with the crank case 17, at the point where the usual drain cock is connected, and said cock is connected with the other branch of the T-coupling, as indicated at 18.

The cover 11 is provided with an internally threaded boss 20 of angular shape, and extended into and engaging the threads of said boss is one end of tube 21, the other end thereof being extended into and engaging an internally threaded opening 22, formed in one end of an indicator chamber 23. Said chamber is constructed in the form of a casing, provided with flanges 24, having suitable openings 25 for the passage of securing screws, or the like, whereby the casing may be secured to the dashboard of the vehicle. The indicator chamber is provided with a longitudinal slot 26, the side edges of which are offset to overhang the chamber, as indicated at 27.

The indicating device consists of a float or buoyant member 28, located within the reservoir casing 10, and provided with a wire or rod 29, extending through the tube 21 into the chamber 23. The end within said indicator chamber 23 is provided with an enlarged or ball-like portion 30, which is clearly visible through the slot 26, being retained in position by the flanges 27. It will be noticed that the ball-like portion 30 is of greater diameter than the opening between the side edges of the overhanging portions 27, whereby said overhanging edges act as guides for said ball-like portion.

In practice, the reservoir casing 10, cap 11 and indicator casing are preferably made of relatively soft metal, such as aluminum, and the rest of the parts of harder metal, such as iron or steel. By means of this arrangement, very tight joints can be made where the pipes and tubes join the other parts. In installing the indicator, the ordinary drain cock is removed from the crank case, and secured to the T-coupling at 18, and said coupling is connected with the crank case at the point previously occupied by said drain cock. The flanges 24 of the casing 23 are then secured to the dashboard, a hole having previously been made in the floor of the vehicle to permit the pipe or tube 21 to pass downwardly therethrough. After the casing 23 is secured in position, the tube 21 is secured to the cover 11, and the latter secured in position to the reservoir casing 10, the latter being suspended from the casing 23 by means of the tube 21 and cover 11. The pipe 14 is then connected to the nipple 12, by means of the coupling 13, and the parts are then in operative position.

In operation, the oil from the crank case passes into the reservoir casing 10, through the pipe 14 and nipple 12, and the parts are so positioned that the level within said casing corresponds to the oil level within the crank case. Said lever is indicated by means of the float 28, which is held up by the oil, and the wire 29 with its enlargement 30, one of the flanges 24 being provided with suitable indicia cooperating with said enlargement, whereby the position of the latter will be an index of the quantity of oil within the casing 10.

The advantages of the invention will be readily apparent to those skilled in the art to which it belongs. It will be noted, for instance, that by making the indicator casing in the form of a slotted chamber, glass and fragile parts are rendered unnecessary, and it is impossible to mar the device to such an extent that its indications are obscured. The device is of simple construction, and can be attached to standard automobiles without injuring the latter. Owing to the fact that the ball-like indicator 30 is accessible through the slot 26, it may be readily lifted up by a suitable tool, and allowed to drop, so that its accuracy may be tested, and false indications due to the sticking of the indicator may be prevented.

Having thus explained the nature of the invention, and described an operative manner of constructing and using the same, although without attempting to set forth all of the forms in which it may be made, or all of the forms of its use, what I claim is:—

1. An indicator of the character described comprising a casing provided with an indicator chamber having an open slot, an indicator member reciprocally having a ball-like element mounted within said chamber and exposed to view through said slot, said ball-like element being of a diameter greater than the width of the slot, whereby it is protected by the edges of said slot and means by which the position of the indicator member is controlled.

2. An indicator of the character described comprising a casing provided with an indicating chamber having an open slot provided with offset overhanging lips, an indicator member reciprocally mounted within said chamber back of said lips and exposed to view through said slot, and means by which the position of the indicator member is controlled.

In testimony whereof I have hereunto set my hand.

JOHN B. MOORE.